(12) United States Patent
Bayer

(10) Patent No.: US 6,320,456 B1
(45) Date of Patent: Nov. 20, 2001

(54) CHARGE PUMP

(75) Inventor: Erich Bayer, Thonhausen (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/545,552

(22) Filed: Apr. 7, 2000

(30) Foreign Application Priority Data

Apr. 7, 1999 (DE) .............................................. 199 15 644

(51) Int. Cl.$^7$ ..................................................... G05F 1/10
(52) U.S. Cl. ............................................ 327/536; 327/589
(58) Field of Search .................................... 327/536, 589, 327/590, 537, 543

(56) References Cited

U.S. PATENT DOCUMENTS 5,877,635 * 3/1999 Lin .......................................... 326/83
5,962,887 * 10/1999 Manning et al. ...................... 257/313

* cited by examiner

Primary Examiner—Jung Ho Kim
(74) Attorney, Agent, or Firm—William B. Kempler; Frederick J. Telecky, Jr.

(57) ABSTRACT

A charge pump (10) includes a supply voltage terminal (16) and a ground terminal (18) for generating at an output terminal an output voltage (34) which is higher than the voltage present at the supply voltage terminal. It has two complementary MOS field-effect transistors (12, 14), the source-drain paths of which are connected in series between the supply voltage terminal and the ground terminal. It further has a driving circuit (26) for driving the two MOS field-effect transistors and a charge storage capacitor connected by one terminal to the point connecting the source-drain paths of the two MOS field-effect transistors. This charge storage capacitor is formed by the gate capacitance of a further MOS field-effect transistor (20), the source-drain path of which is connected at one end via a first diode (22) to the supply voltage terminal and at the other end via a second diode (24) to the output terminal. The gate of this field-effect transistor is connected to the point connecting the series arrangement of the source-drain paths of the two complementary MOS field-effect transistors.

4 Claims, 1 Drawing Sheet

CHARGE PUMP

Figure 1:
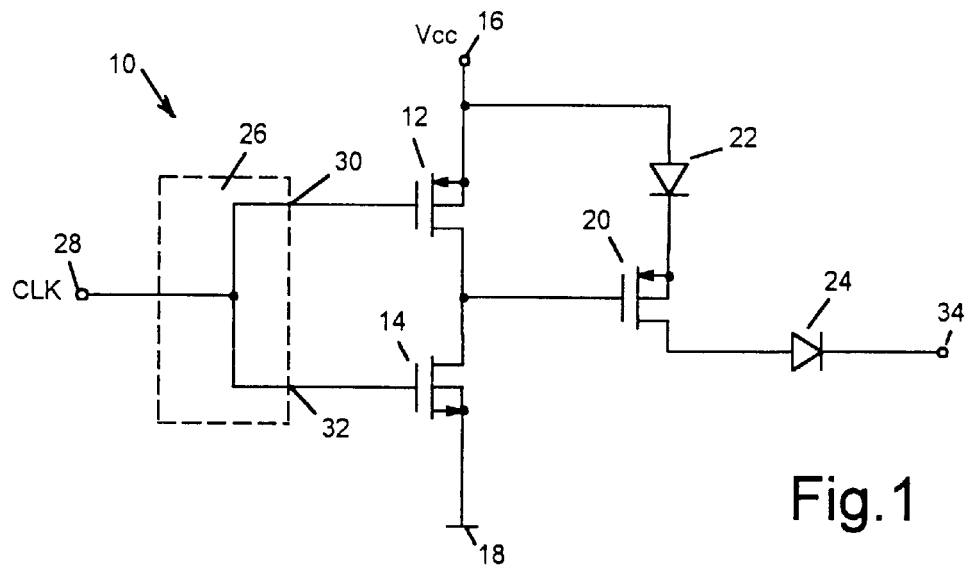

The invention relates to a charge pump with a supply voltage terminal and a ground terminal for generating at an output terminal an output voltage which is higher than the voltage present at the supply voltage terminal, with two complementary MOS field-effect transistors, the source-drain paths of which are connected in series between the supply voltage terminal and the ground terminal, a driving circuit for driving the two MOS field-effect transistors and a charge storage capacitor connected by one terminal to the point connecting the source-drain paths of the two MOS field-effect transistors.

Charge pumps find application in electronic circuits whenever a voltage is needed in a circuit which is higher than the available supply voltage. One such charge pump is described and illustrated in "MOS-Bauelemente in der Leistungselektronik (MOS Components in Power Electronics)" by Felix Schbrlin, published by Franzis Verlag, 1997, page 84. In this circuit a conductive connection exists between the supply voltage terminal and the output terminal via two diodes connected in series so that current is always able to flow via this connection which loads the supply voltage source even when the charge pump is not in operation. To prevent this undesired flow of current a separate switch needs to be provided to open-circuit this current.

The invention is based on the object of providing a charge pump of the aforementioned kind which requires no components other than those needed for the charge pump itself.

In accordance with the invention this object is achieved in that the charge storage capacitor is formed by the gate capacitance of a further MOS field-effect transistor, the source-drain path of which is connected at one end via a first diode to the supply voltage terminal and at the other end via a second diode to the output terminal, and the gate of which is connected to the point connecting the series arrangement of the the source-drain paths of the two complement MOS field-effect transistors.

In the charge pump in accordance with the invention the source-drain path of a further MOS field-effect transistor is inserted between the two diodes connecting the supply voltage terminal to the output terminal, this further MOS field-effect transistor acting as a switch which in the OFF state prevents any flow of current from the supply voltage terminal to the output terminal. This MOS field-effect transistor is, however, not an additional component in the charge pump since its gate capacitance simultaneously functions as the charge storage capacitor of a conventional charge pump. It is in this way that loading the supply voltage source when the charge pump is not in operation is avoided without increasing the number of components required.

Figure 2:
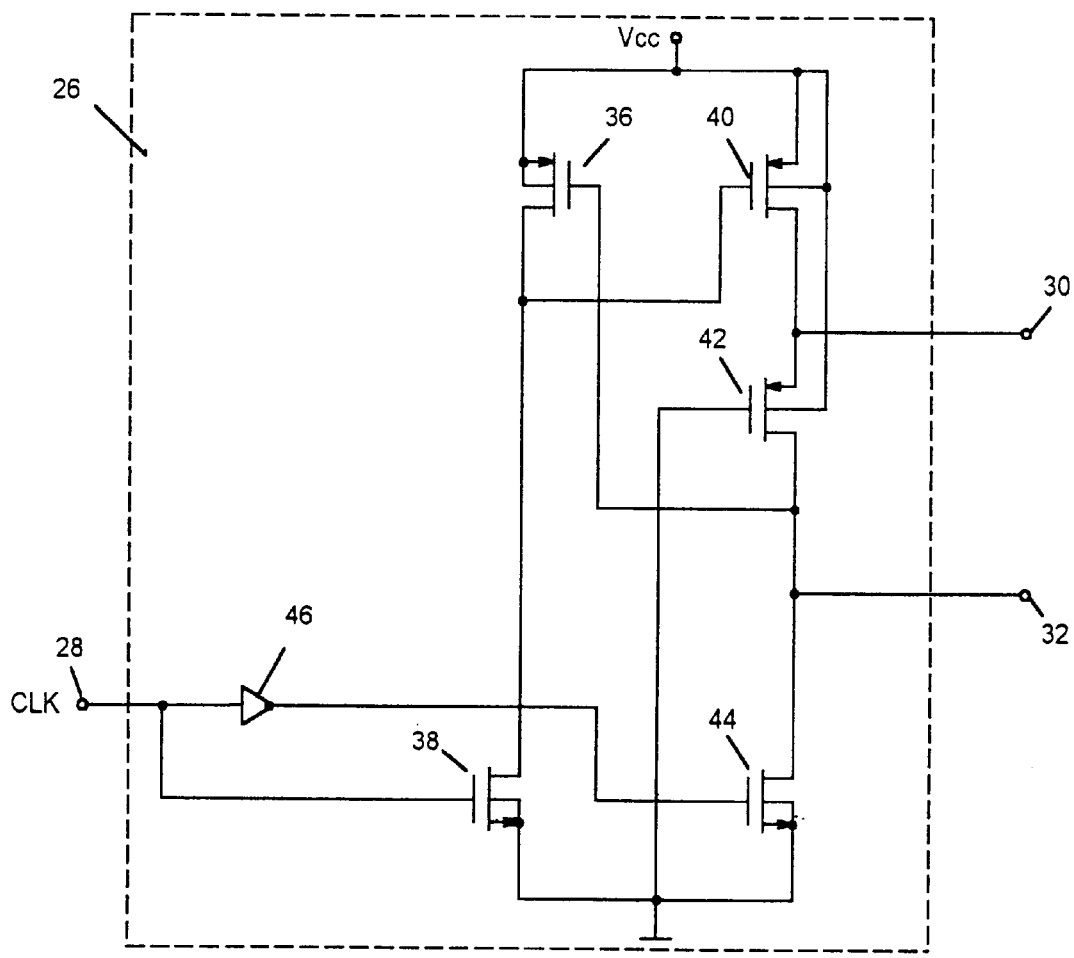

The invention will now be described by way of an example as shown in the drawing in which:

FIG. 1 is a single-line circuit diagram of the charge pump in accordance with the invention and FIG. 2 illustrates an example of a clock generator usable in this charge pump.

Referring now to FIG. 1 there is illustrated a charge pump 10 comprising two complementary MOS field-effect transistors connected in series, namely a p-channel MOS field-effect transistor 12 and an n-channel MOS field-effect transistor 14. The source-drain paths of these two MOS field-effect transistors are connected in series between the supply voltage terminal 16 and the ground terminal 18. Connected to the point connecting the source-drain paths of the two MOS field-effect transistors 12, 14 is the gate of a further MOS field-effect transistor 20 which is a p-channel MOS field-effect transistor. Connected between the supply voltage terminal 16 and the source-drain path of the MOS field-effect transistor 20 is a diode 22, the anode of which is connected to the supply voltage terminal 16. The anode of a further diode 24 is connected to the other end of the source-drain path of the MOS field-effect transistor 20, the cathode of this diode forming the output terminal of the charge pump.

The charge pump 10 comprises further a driving circuit 26 which in its simplest form, as shown in FIG. 1, applies a clock signal CLK applied to an input terminal 28 via outputs 30 and 32 to the gates of the MOS field-effect transistors 12 and 14. The clock signal CLK is a usual square-wave signal.

The charge pump as shown in FIG. 1 works as follows:

When the charge pump is not in operation, i.e. no voltage higher than the supply voltage Vcc at the supply voltage terminal 16 is needed at the output terminal 34, a signal having a low value corresponding to the binary value L is applied to the input 28 of the driving circuit 26, resulting in a L signal also being applied to the gates of the MOS field-effect transistors 12 and 14. Since the MOS field-effect transistor 12 is a p-channel transistor, this means that it is ON whereas the MOS field-effect transistor 14 is OFF due to it being an n-channel transistor. Since MOS field-effect transistor 12 is ON the supply voltage Vcc is applied to the gate of the MOS field-effect transistor 20 resulting in this transistor being maintained OFF.

Accordingly, in the idle condition of the charge pump there is no connection between the supply voltage terminal 16 and the output terminal 34 due to this connection being open-circuited by the MOS field-effect transistor 20, i.e. no current loading the supply voltage source is able to flow.

As soon as a voltage is required at the output terminal 34 which is higher than the supply voltage Vcc at the supply voltage terminal 16 the clock signal CLK is applied to the input 28 of the gate control circuit 26, the clock signal having the shape of a square-wave signal. This clock signal CLK thus alternates periodically with the clock frequency between the signal values L and H, as a result of which the two complementary MOS field-effect transistors 12 and 14 are alternatively turned ON and OFF, i.e. when the one is OFF the other is ON, and vice-versa.

Assuming now the idle condition as described above, the first change in state of the two MOS field-effect transistors consists of the MOS field-effect transistor 12 being turned OFF by the high signal value H of the clock signal, whilst the MOS field-effect transistor 14 is turned ON by this signal.

Due to the ON status of the MOS field-effect transistor 14 the gate of the MOS field-effect transistor 20 is grounded causing this transistor to be ON. At the same time the gate capacitance of this field-effect transistor is charged.

As soon as the clock signal at the input 28 has again the low signal value L this results in the states of the two MOS field-effect transistors 12 and 14 likewise being reversed, i.e. the MOS field-effect transistor 12 is returned ON whilst the MOS field-effect transistor 14 changes to OFF. The charging voltage present at the gate of the MOS field-effect transistor 20 is then added to the supply voltage Vcc, the MOS field-effect transistor 20 continuing to remain ON until its gate-source voltage exceeds its threshold voltage. As soon as the threshold voltage is no longer attained this transistor turns OFF. It is in this way that a maximum voltage which is twice the value of the supply voltage Vcc less the forward voltage of the diode 22 materializes at the charge storage capacitor formed by the gate capacitance of the MOS field-effect transistor 20. This maximum voltage less the forward voltage of the second diode 24 is available at the output terminal 34.

It is evident that the MOS field-effect transistor 20 simultaneously functions as a switch which open-circuits the current path between the supply voltage source and the output terminal 34 when the charge pump is not in operation, and assumes the function of a charge storage capacitor as employed in conventional charge pump circuits for generating the increased voltage.

Referring now to FIG. 2 there is illustrated an example configuration of a driving circuit as may be employed as the gate control circuit 26 in the charge pump 10 as shown in FIG. 1.

The clock 26 contains a first circuit branch in which the source-drain paths of two complementary MOS field-effect transistors 36 and 38 are connected in series. The field-effect transistor 36 is a p-channel MOS field-effect transistor and the field-effect transistor 38 is an n-channel MOS field-effect transistor. In a second circuit branch the source-drain paths of three MOS field-effect transistors, namely a p-channel MOS field-effect transistor 40, a further p-channel MOS field-effect transistor 42 as well as an n-channel MOS field-effect transistor 44 are connected in series. The two circuit branches are connected at one end to the supply voltage Vcc and at the other end to ground. It is evident that the gate of the MOS field-effect transistor 36 is connected to the point connecting the source-drain paths of the two MOS field-effect transistors 42 and 44 whilst the gate of the MOS field-effect transistor 40 is connected to the point connecting the source-drain paths of the MOS field-effect transistors 36 and 38. The gate of the MOS field-effect transistor 42 is connected to ground. The output 30 outputting the gate control signal for the MOS field-effect transistor 12 is connected to the point connecting the source-drain paths of the MOS field-effect transistors 42 and 44. The gate of the MOS field-effect transistor 38 is connected to the input 28 which receives the clock signal CLK whilst the gate of the MOS field-effect transistor 44 is connected to the output of a negator 46 which negates the clock signal supplied to the input 28.

When a signal with a low binary value L is applied to the input 28 in the idle condition of the charge pump the MOS field-effect transistor 38 is turned OFF whilst the MOS field-effect transistor 44 is turned ON because due to the effect of the negator 46 its gate being supplied with a signal having the high binary value H. The ground value applied to the gate of the MOS field-effect transistor 36 due to the ON status of the MOS field-effect transistor 44 turns this field-effect transistor ON which input terminal resulting in the gate of the MOS field-effect transistor 40 receiving a high signal value corresponding to the supply voltage value which turns this transistor OFF. Due to the ground value at the gate of the MOS field-effect transistor 42 this transistor is ON. In this idle condition the driving signals at the outputs 30 and 32 have the same value L which, as already explained above, results in the MOS field-effect transistor 12 being maintained ON whilst the MOS field-effect transistor 14 remains OFF.

To start the charge pump 10 the square-wave clock signal CLK is applied to the input 28. On the first L/H transition the MOS field-effect transistor 38 is turned ON and MOS field-effect transistor 44 OFF, resulting in MOS field-effect transistor 36 likewise being turned OFF and MOS field-effect transistor 40 ON, MOS field-effect transistor 14 remaining ON. A high signal H is then output at the outputs 30 and 32 which turns the MOS field-effect transistor 12 OFF and MOS field-effect transistor 14 ON. The MOS field-effect transistor 42, inserted between the two conductors leading to the gates of the MOS field-effect transistors 12 and 14, results in the MOS field-effect transistor 12 being turned ON somewhat later than MOS field-effect transistor 14. This is favorable since it prevents MOS field-effect transistor 14 still being ON when MOS field-effect transistor 12 is likewise ON which would otherwise result in a temporary flow of current between the supply voltage terminal 16 and the ground terminal 18 possibly causing an unwanted current pulse. Due to the delay in applying the driving signals to the gates of the two MOS field-effect transistors 12 and 14 the driving circuit 26, as shown in FIG. 2, thus prevents unwanted current pulses materializing on a L/H and vice-versa transition due to the two MOS field-effect transistors 12 and 14 being simultaneously ON.

What is claimed is:

1. A charge pump comprising a supply voltage terminal and a ground terminal for generating at an output terminal an output voltage which is different from the voltage present at the supply voltage terminal, with two complementary MOS field-effect transistors, the source-drain paths of which are connected in series between said supply voltage terminal and said ground terminal, a driving circuit for driving said two MOS field-effect transistors and a charge storage capacitor connected by one terminal to the point connecting said source-drain paths of said two MOS field-effect transistors, wherein said charge storage capacitor is formed by the gate capacitance of a further MOS field-effect transistor (20), the source-drain path of which is connected at one end via a first diode (22) to said supply voltage terminal (16) and at the other end via a second diode (24) to said output terminal (34), and the gate of which is connected to the point connecting the series of the source-drain paths of said two complementary MOS field-effect transistors (12, 14).

2. The charge pump of claim 1, wherein said MOS field-effect transistor (12), the source-drain path of which is connected to said supply voltage terminal (16), is a p-channel MOS field-effect transistor, that said MOS field-effect transistor (14) the source-drain path of which is connected to said ground terminal (18), is an n-channel MOS field-effect transistor and that said further MOS field-effect transistor (20) is an n-channel MOS field-effect transistor.

3. The charge pump of claim 1 wherein said output voltage is higher than the voltage present at a the supply voltage terminal.

4. The charge pump of claim 2 wherein said output voltage is higher than the voltage present at a the supply voltage terminal.

* * * * *